(12) United States Patent
Goldstein et al.

(10) Patent No.: US 8,212,653 B1
(45) Date of Patent: Jul. 3, 2012

(54) PROTECTED ZONE SYSTEM

(75) Inventors: Arthur L. Goldstein, Weston, MA (US); Michael K. Dempsey, Groton, MA (US); Ronald S. Newbower, Boston, MA (US)

(73) Assignee: The General Hospital Corp., Boston, MA (US)

( * ) Notice: Subject to any disclaimer, the term of this patent is extended or adjusted under 35 U.S.C. 154(b) by 1140 days.

(21) Appl. No.: 12/052,543

(22) Filed: Mar. 20, 2008

(51) Int. Cl.
H04Q 5/22 (2006.01)
G08B 13/14 (2006.01)
G05B 19/00 (2006.01)

(52) U.S. Cl. ............ 340/10.1; 340/10.5; 340/573.1; 340/572.1; 340/5.1; 235/375

(58) Field of Classification Search ............ 340/10.1, 340/573.1, 539.1, 539.11, 572.1, 528, 600, 340/5.1; 235/375; 700/108, 9; 705/2; 73/290
See application file for complete search history.

(56) References Cited

U.S. PATENT DOCUMENTS

| | | | |
|---|---|---|---|
| 5,202,666 | A | 4/1993 | Knippscheer |
| 5,610,589 | A | 3/1997 | Evans et al. |
| 5,812,059 | A | 9/1998 | Shaw et al. |
| 5,952,924 | A * | 9/1999 | Evans et al. ............ 340/573.1 |
| 6,236,317 | B1 | 5/2001 | Cohen et al. |
| 6,392,546 | B1 | 5/2002 | Smith |
| 6,426,701 | B1 | 7/2002 | Levy et al. |
| 6,574,482 | B1 | 6/2003 | Radomsky et al. |
| 6,727,818 | B1 | 4/2004 | Wildman et al. |
| 6,882,278 | B2 | 4/2005 | Winings et al. |
| 6,883,563 | B2 | 4/2005 | Smith |
| 6,956,498 | B1 | 10/2005 | Gauthier et al. |
| 6,975,231 | B2 * | 12/2005 | Lane et al. ............ 340/573.1 |
| 6,977,579 | B2 | 12/2005 | Gilfix et al. |
| 7,015,816 | B2 | 3/2006 | Wildman et al. |
| 7,099,649 | B2 | 8/2006 | Patterson et al. |
| 7,099,895 | B2 | 8/2006 | Dempsey |
| 7,242,307 | B1 | 7/2007 | LeBlond et al. |
| 7,248,933 | B2 * | 7/2007 | Wildman ............ 700/90 |
| 7,348,736 | B2 | 3/2008 | Piepgras et al. |
| 7,403,111 | B2 | 7/2008 | Tessier et al. |
| 7,480,567 | B2 | 1/2009 | Suomela et al. |
| 7,496,445 | B2 | 2/2009 | Mohsini et al. |
| 7,577,444 | B2 | 8/2009 | Bird et al. |
| 7,620,493 | B2 | 11/2009 | Stankiewicz et al. |

(Continued)

OTHER PUBLICATIONS

International Search Report and Written Opinion, from PCT/US10/039002, mailed Feb. 9, 2011.

(Continued)

Primary Examiner — Nam V Nguyen
(74) Attorney, Agent, or Firm — Nutter McClennen & Fish LLP

(57) ABSTRACT

A system is provided for establishing a protected zone and monitoring interactions therewith. The system includes a protected zone designator and a wearable device. The protected zone designator establishes the protected zone. The protected zone designator is configured for placement at a location in which the protected zone is desired. The wearable device is separate and distal from the protected zone designator. The wearable device includes a protected zone recognition component configured to recognize the protected zone and identify pre-defined interaction criteria for the protected zone. Upon the wearable device entering the protected zone, the protected zone recognition component recognizes the protected zone and identifies the interaction criteria of the protected zone. Based on the interaction criteria the wearable device determines and records compliance with the interaction criteria.

56 Claims, 9 Drawing Sheets

U.S. PATENT DOCUMENTS

| | | | |
|---|---|---|---|
| 7,770,782 B2* | 8/2010 | Sahud | 235/375 |
| 7,818,083 B2* | 10/2010 | Glenn et al. | 700/108 |
| 2004/0150527 A1 | 8/2004 | Harper et al. | |
| 2005/0248461 A1 | 11/2005 | Lane et al. | |
| 2007/0008146 A1 | 1/2007 | Taylor et al. | |
| 2007/0020212 A1 | 1/2007 | Bernal et al. | |
| 2007/0257803 A1 | 11/2007 | Munro et al. | |
| 2008/0100441 A1 | 5/2008 | Prodanovich et al. | |
| 2008/0120029 A1 | 5/2008 | Zelek et al. | |
| 2008/0246599 A1 | 10/2008 | Hufton et al. | |
| 2009/0184823 A1 | 7/2009 | Tessier | |
| 2009/0189759 A1 | 7/2009 | Wildman et al. | |
| 2010/0321180 A1 | 12/2010 | Dempsey | |

OTHER PUBLICATIONS

International Search Report and Written Opinion for Application No. PCT/US2011/029549, mailed Feb. 9, 2011.

* cited by examiner

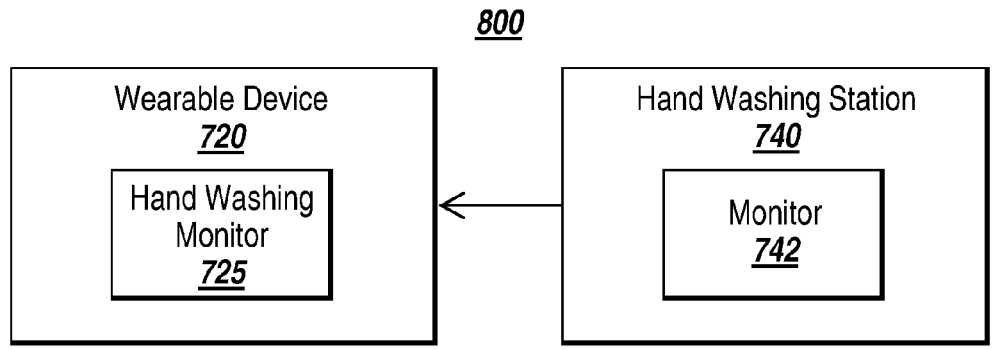
Fig. 8
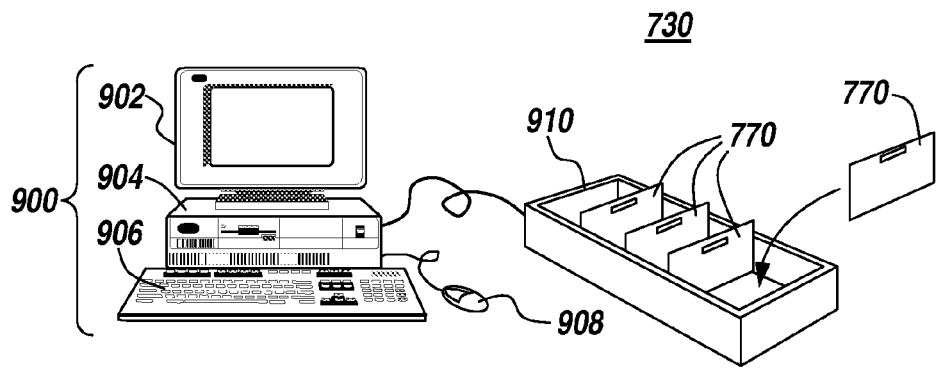
Fig. 9
Fig. 10

PROTECTED ZONE SYSTEM

FIELD OF THE INVENTION

The present invention deals with enforcement of protocols in facilities. More specifically, the present invention deals with establishing designated areas where protocol enforcement is desired and monitoring interactions with the designated areas to determine compliance with protocols.

BACKGROUND OF THE INVENTION

Many facilities have protocols in place to comply with health, safety, insurance, and regulatory requirements. In large facilities, such as factories and hospitals, there may be a large number of people, equipment, areas, and other resources to keep track of in the enforcement of protocols. In addition to the large number, there are also many different types of people, equipment, areas, and resources. Each of the different types of people, equipment, areas, and resources may have different types of protocols associated with them.

For example, there may be specific areas or zones where only qualified personal are permitted. In factories, these protected zones may be hazardous zones where dangerous equipment or chemicals are used and only qualified personal with appropriate safety gear are permitted. The level of qualification for a zone may range from requiring a hard-hat when in the zone to requiring a protective suit and respirator when in the zone. Factories may also have other zones such a clean rooms and secure rooms where certain procedures must be observed and require specific training or security clearance for admittance.

Hospitals can include even more permutations as hospitals have to deal with both employees and non-employees, and may require the enforcement of several different types of protocols. At any given time, in addition to the medical professionals, administrative staff, and janitorial staff, there are a number of patients, visitors, consultants, contractors, and the like, in the hospital. Each of these individuals may have different protocol requirements associated with them. Hospitals may also have several areas with specific protocol requirements, such as for example, patients' rooms, laboratories, surgical theaters, clean rooms, intensive care areas, quarantined areas, radiology, record rooms, administrative offices, data and security centers, medical supply rooms. Each of these areas may require a different protocol. Hospitals may also require use of temporary or non-permanent protocols. For example, a protection protocol may be required for specific patient or piece of equipment. A patient or bed holding a patient may be designated as contagious. Thus, only appropriately qualified and equipped medical professionals should be allowed in proximity of the patient or bed. Other protocols may be generic to a type of person or area.

Enforcement of even simple protocols may be difficult when dealing with a large busy location such as a hospital. An example of one such protocol in a hospital is a hand hygiene or hand washing protocol. Studies have indicated that proper adherence to hand hygiene protocols can significantly reduce morbidity and mortality rates caused by hospital acquired infections. However, enforcement of the behaviors specified in hand hygiene protocols can be difficult in a hospital due to the large number of individuals requiring monitoring and the generally busy fast-paced operating environment.

Accordingly, a system is needed that can encourage compliance with protocols and can also document behavior and enforce protocols associated with areas or individuals and can be configured as necessary based on the area or individuals involved.

SUMMARY OF THE INVENTION

In view of the above, it would be beneficial to be able to establish and monitor protected zones and the behavior of various individuals in and near those zones for which specific protocols exist. The protected zone may be established using a protected zone designator. Individuals interacting with the protected zones are provided with a wearable device. The wearable device recognizes a signal provided by the protected zone designator and identifies predetermined or pre-defined criteria for interacting with the protected zone. It is then determined whether the wearer of the wearable device complies with the criteria. The criteria relate to the protocols for the protected zone and may be configurable as necessary to influence, monitor, and document behavior to enforce a protocol.

In accordance with one embodiment of the present invention, a system is provided to establish a protected zone and monitor interactions therewith. The system includes a protected zone designator and a wearable device. The protected zone designator is for establishing the protected zone. The protected zone designator is configured for placement at a location where the protected zone is desired. The wearable device is separate and distal from the protected zone designator. The wearable device includes a protected zone recognition component configured to recognize the protected zone and identify pre-defined interaction criteria for the protected zone. Upon the wearable device entering the protected zone, the protected zone recognition component recognizes the protected zone and identifies the interaction criteria of the protected zone. Based on the interaction criteria the wearable device determines and records compliance with the interaction criteria.

In accordance with some embodiments of the present invention, the interaction criteria may include temporal requirements. In other embodiments, the interaction criteria may be derived from the identity or role of the individual interacting with the protected zone. In certain embodiments, the interaction criteria include hand washing requirements. The interaction criteria may also include requirements upon the individual exiting the protected zone.

In accordance with some embodiments of the present invention, the wearable device may issue a notice that the protected zone has been entered. If it is determined that the wearer of the wearable device is not in compliance with the criteria, the wearable device may enter a non-compliant mode and issue an alarm. In certain embodiments, the wearable device may be provided with an override for the alarm.

In accordance with some embodiments of the present invention, the system may further include a base station. The base station is configured to communicate with the wearable device for transferring data back and forth between the base station and wearable device. In some embodiments, the communication between the base station and wearable device is wireless.

In accordance with another embodiment of the present invention, a method is provided for establishing a protected zone and monitoring interactions therewith. The method involves a protected zone designator transmitting a signal that defines the protected zone. A wearable device receives the signal upon entry of the wearable device into the protected zone. The wearable device identifies predetermined or pre-defined interaction criteria for the protected zone. Based on the interaction criteria, the wearable device determines and records compliance with the interaction criteria.

BRIEF DESCRIPTION OF THE FIGURES

These and other characteristics of the present invention will be more fully understood by reference to the following detailed description in conjunction with the attached drawings, in which:

FIG. 8 depicts a block diagram of one portion of the system of FIG. 7;

FIG. 9 depicts one example embodiment of a base station used in the system of FIG. 7;

FIG. 10 one example embodiment of a graphical user interface provided by the base station of FIG. 9;

DETAILED DESCRIPTION OF THE INVENTION

Figure 1:
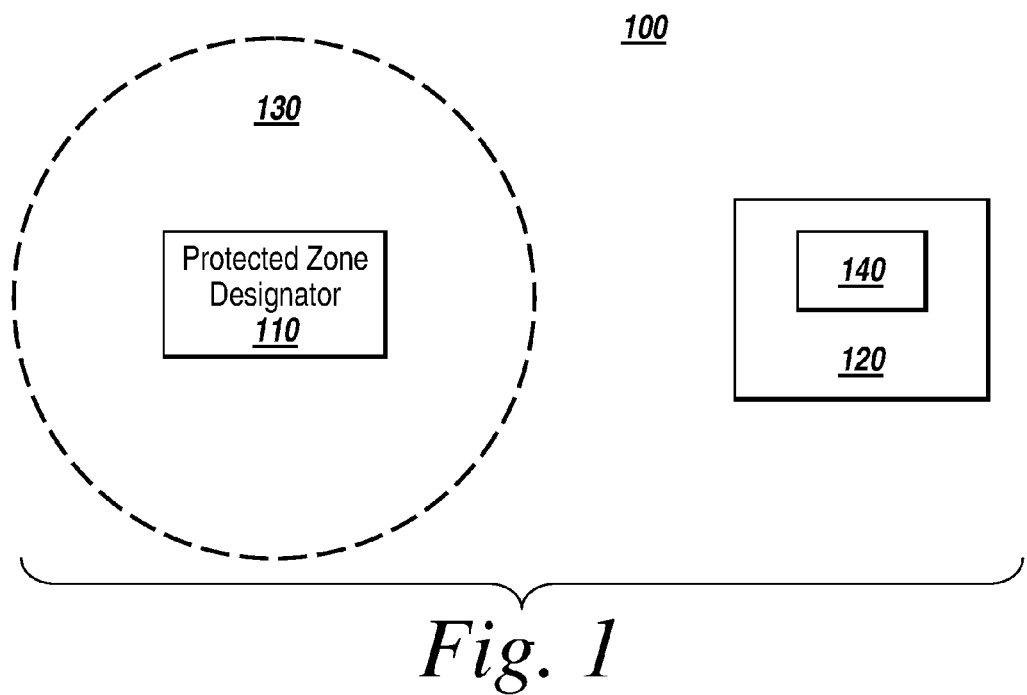
FIG. 1 depicts a block diagram of an example embodiment of a system for establishing a protected zone and monitoring interaction therewith.

The present invention provides a system and methodology to enforce protocols relating to use of, or interactions with, specified areas in facilities. In order to enforce protocols relating to these specified areas, the system establishes what is referred to herein as a protected zone in areas where protocol enforcement is desired. The system establishes these protected zones using protected zone designators that are placed in the area. The protected zone identifiers establish the protected zone (in accordance with one example embodiment) by transmitting one or more signals. The area blanketed by the signal is commensurate with the area of the protected zone. Therefore, the transmission of the signal is the action that establishes the protected zone. Individuals interacting with the area of the protected zone are provided with wearable devices that receive the signals transmitted from the protected zone designators. When an individual enters a protected zone, their wearable device receives the transmitted signal and recognizes that a protected zone has been established in the area. Once a protected zone has been recognized, the wearable device identifies any criteria there may be for interacting with the protected zone as specified by the protocol being enforced. The wearable device then determines if the individual is in compliance with the criteria and logs the result of the determination. Compliance may include assessment of how the individual interacts with items in the area, such as a hand-washing station. The logged compliance data may later be analyzed to determine the effectiveness of the enforcement.

FIGS. 1 through 14, wherein like parts are designated by like reference numerals throughout, illustrate example embodiments of a system and method for enforcing protocols relating to use of, or interactions with, protected zones, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

System

FIG. 1 depicts one example embodiment of a system 100 for establishing a protected zone and monitoring interactions therewith. The system 100 includes a protected zone designator 110 and a wearable device 120 separate from the protected zone designator 110. In use, the protected zone designator 110 establishes a protected zone 130. When the wearable device 120 enters the protected zone 130, a protected zone recognition component 140 of the wearable device recognizes the protected zone 130 and identifies the interaction criteria of the protected zone 130. Based on the interaction criteria, the wearable device 120 determines and records compliance with the interaction criteria. Each of the elements of the system including their operation and interaction with other elements are discussed in more detail below.

Protected Zone Designator

The first element of the system 100 is the protected zone designator 110. The protected zone designator 110 establishes or designates the protected zone 130 by, for example, emitting a signal. As such, the protected zone designator 110 may be configured for placement at a location where a protected zone 130 is desired. A protected zone 130 may be established anywhere the enforcement of protocols is desired. For example, a protected zone 130 may be used for patients, beds, rooms, equipment, or the like. As such, the protected zone designator 110 is designed for easy placement at a number of locations.

Figure 2:
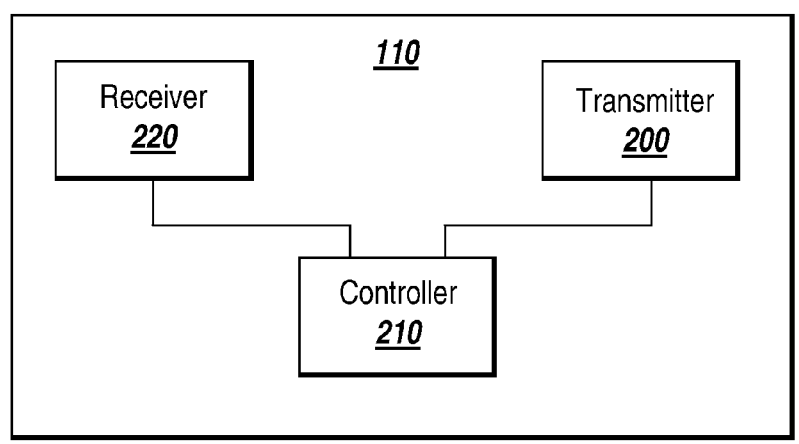
FIG. 2 depicts a block diagram of an example embodiment of protected zone designator useable in the system of FIG. 1.

FIG. 2 depicts one embodiment of example components that make up a protected zone designator 110. In this embodiment, the protected zone designator 110 includes a transmitter 200 and a controller 210. The transmitter 200 transmits a signal to establish the protected zone. The controller 210 controls the transmitter 200 and the signal. The range of the signal transmitted by the transmitter 200 establishes the outer limits of the protected zone 130, unless there are obstructions that limit the signal as later discussed. The transmitter 200 may be, but is not limited to, an ultrasonic (US) transmitter, an infrared (IR) transmitter, or a radio frequency (RF) transmitter. Protocols such as Wi-fi, Bluetooth, and Zigbee may also be used depending on the environment and potential interference with other devices not related to the present invention. In some embodiments, the protected zone designator 110 may include multiple transmitters, which may be of different types.

The controller 210 may be any type of controller, microcontroller, processor, or microprocessor suitable for controlling a transmitter 200. The controller may dictate what type of signal the transmitter 200 transmits, or may dictate variations in how the signal transmits. The signal transmitted by the transmitter 200 to establish the protected zone may be a unique, semi-unique, non-unique signal or any combination thereof. For example, a unique signal may be used in correlation with a specific patient, while a semi-unique signal may be used with a type of patient. In some embodiments, an identification number and/or other information, such as date and time information, is transmitted. The transmission of the signal may be continuous, periodic, in response to a signal received at the protected zone designator 110, or any combination thereof. The type of signal as well as signal strength may be user specified using the controller 210.

In certain embodiments, the protected zone designator 110 further includes a receiver 220. The receiver 220 receives signals at the protected zone designator. The receiver 220 may be, but is not limited to, an ultrasonic (US) receiver, an infrared (IR) receiver, or a radio frequency (RF) receiver, and corresponds to the transmission signal. Protocols such as Wi-fi, Bluetooth, and Zigbee may also be used. In some embodiments, the protected zone designator 110 may include multiple receivers, which may be of different types. In some embodiments the receiver 220 may be used receive signals for configuring the protected zone designator 110. In certain embodiments, the receiver 220 may be used in conjunction with the transmitter 200 and controller 210 to make a transponder that transmits a signal in response to a signal received at the protected zone designator 110. In some such embodiments, the range and/or type of signal transmitted may be determined by the signal received by the receiver 220.

Figure 3:
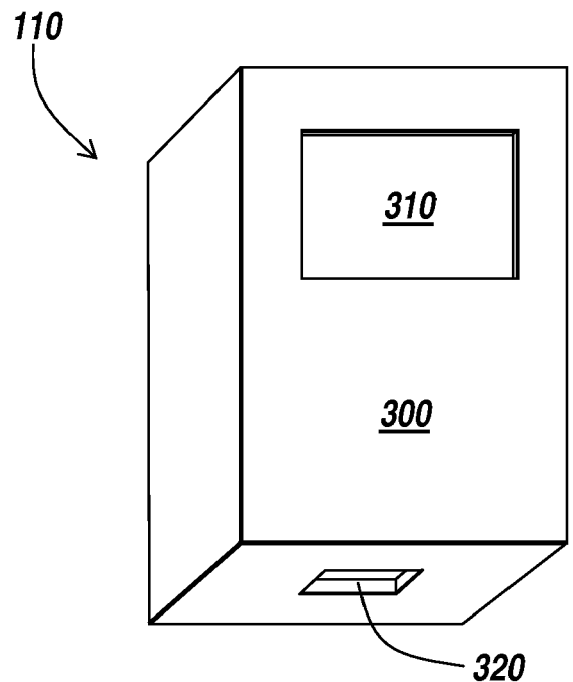
FIG. 3 depicts a perspective view of the example protective zone designator of FIG. 2.

FIG. 3 depicts an example embodiment of a protected zone designator 110 configured for placement at a location a protected zone is desired. The protected zone designator 110 may include a housing 300 for housing the transmitter 200, controller 210, and the receiver 220. The housing may be formed of plastic, metal, or other suitable materials. The housing may be sized and dimensioned to allow for easy placement of the protected zone designator 110 in a number of locations. In embodiments where the transmitter 200 or receiver 220 are IR based, the housing may further include a window 310 allowing for the transmission and/or reception of IR signals. The window 310 may be formed of any suitably transparent material, such as plastic or glass. In certain embodiments, the protected zone designator 110 may be battery powered. In other embodiments, the protected zone designator 110 may plug into a wall socket, or be hardwired into a power source or grid.

In accordance with some example embodiments of the present invention, the protected zone designator 110 may further include a data port 320 for the transfer of data to and from the protected zone designator 110. The data port 320 may be used to communicate with the controller 210 to configure the protected zone designator 110. Examples of a suitable data ports include a serial port, such as a USB port, or an Ethernet port. Other possible ports will be apparent to one skilled in the art given the benefit of this disclosure. In other embodiments, the transmitter 200 and receiver 220 of the protected zone designator 110 are used to pass data back and forth from the protected zone designator 110.

Wearable Device

The second element of the system is the wearable device 120. The wearable device 120 is separate and distal from the protected zone designator 110. Typically, in use, a user wears the wearable device to track the wearer's interaction with the protected zone 130. The wearable device 120 includes a protected zone recognition component 140 configured to recognize the protected zone 130 and identify pre-defined interaction criteria for the protected zone 130. One example embodiment of a protected zone recognition component 140 is depicted in FIG. 4.

Figure 4:
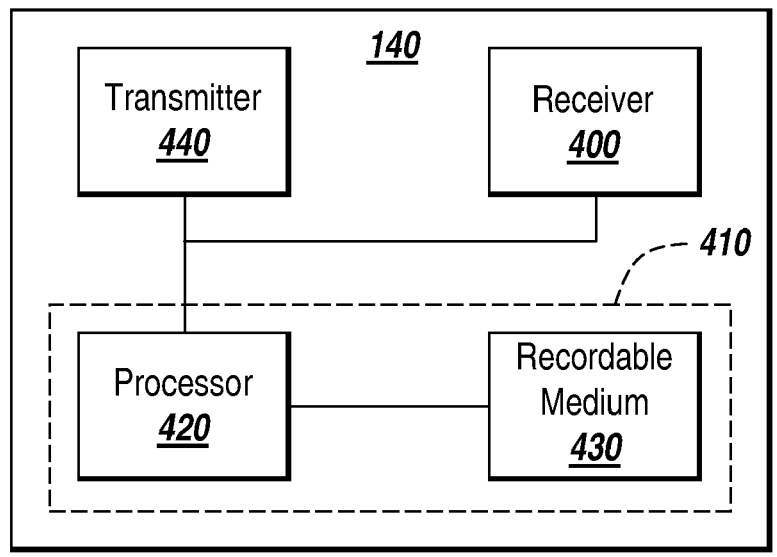
FIG. 4 depicts a block diagram of an example embodiment of wearable device useable in the system of FIG. 1.

In the example of FIG. 4, the protected zone recognition component 140 has a receiver 400 and a computing device 410. The receiver 400 receives a signal, such as the signal transmitted from a protected zone designator 110. The computing device 410 is in communication with the receiver 400 and processes signals received by the receiver 400 to recognize a protected zone 130, identify pre-defined interaction criteria for the protected zone 130, determine compliance with the interaction criteria, and record whether or not there is compliance with the interaction criteria.

The receiver 400 may be, but is not limited to, an ultrasonic (US) receiver, an infrared (IR) receiver, or a radio frequency (RF) receiver. Protocols such as Wi-fi, Bluetooth, and Zigbee may also be used. Preferably, the receiver 400 is of the same type as the transmitter 200 in the protected zone designator 110 allowing the wearable device to receive a transmission from the protected zone designator 110 designating a protected zone. In accordance with some embodiments of the present invention, the wearable device may include multiple receivers that may be of different types. In accordance with some embodiments of the present invention, the receiver 400 may be used receive signals for configuring the wearable device 120. For example, predetermined or pre-defined criteria for a protected zone 130 may be configured by a signal received at the wearable device 120. Likewise, the wearable device 120 can be configured to be associated with a particular user wearing the wearable device 120. For example, each wearable device 120 may have a unique identification number that can be associated with a particular user.

In the example of FIG. 4, the computing device 410 includes a processor 420 and a recordable medium 430. The processor 420 may be any suitable processor capable of interfacing with the receiver 400 and processing signals received by the receiver to recognize a protected zone 130, identify pre-defined interaction criteria for the protected zone 130, determine compliance with the interaction criteria, and record whether or not there is compliance with the interaction criteria. Suitable processors will be apparent to one skilled in the art given the benefit of this disclosure. The recordable medium 430 is used to store instructions for the processor 420, including interaction criteria, and data obtained or generated by the processor 420, including compliance with the interaction criteria. Such data may include the date, time, and result, of any interaction with a protected zone 130. In the example of FIG. 4, the recordable medium is a memory device. Other suitable recordable mediums will be apparent to one skilled in the art given the benefit of this disclosure.

In certain example embodiments of the present invention, the protected zone recognition component 140 may further include one or more transmitters 440. The one or more transmitters 440 transmit signals from the wearable device 120. The one or more transmitters 440 may be, but are not limited to, an ultrasonic (US) transmitter, an infrared (IR) transmitter, or a radio frequency transmitter (RF) receiver. Protocols such as Wi-fi, Bluetooth, and Zigbee may also be used. In accordance with some embodiments of the present invention, the wearable device may include multiple transmitters, which may be of different types In certain embodiments, the one or more transmitters 440 may be used in conjunction with the receiver 400 in a transponder configuration. In such a configuration, the one or more transmitters 440 transmits a query signal to the receiver 220 of the protected zone designator 110 that in turn transmits a signal in response from the transmitter 200 of the protected zone designator 110. In some such embodiments, the signal transmitted by the one or more transmitters 440 of the protected zone recognition component 140 determines the range and/or type of signal transmitted by the protected zone designator 110.

Figure 5A:
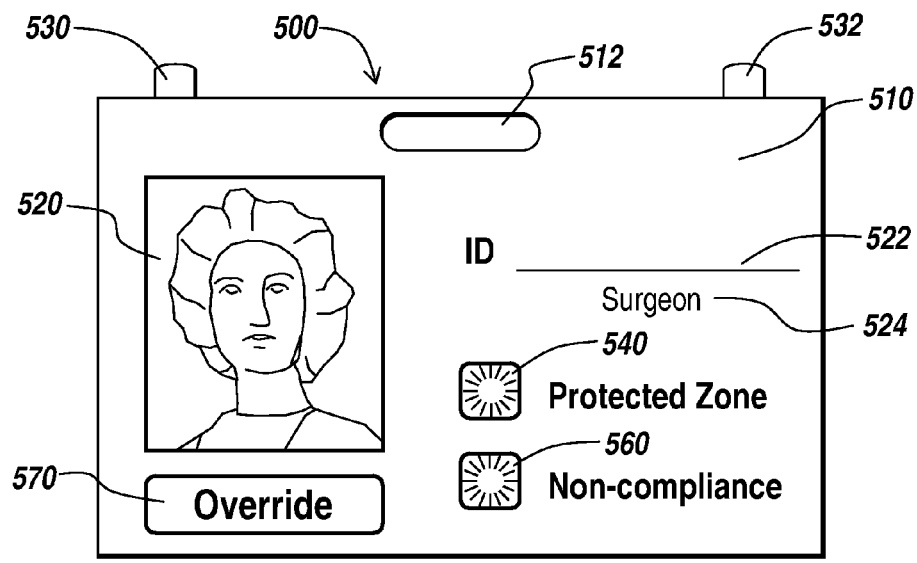
FIG. 5A depicts a front perspective view of an example wearable device wherein the wearable device is a badge.
Figure 5B:
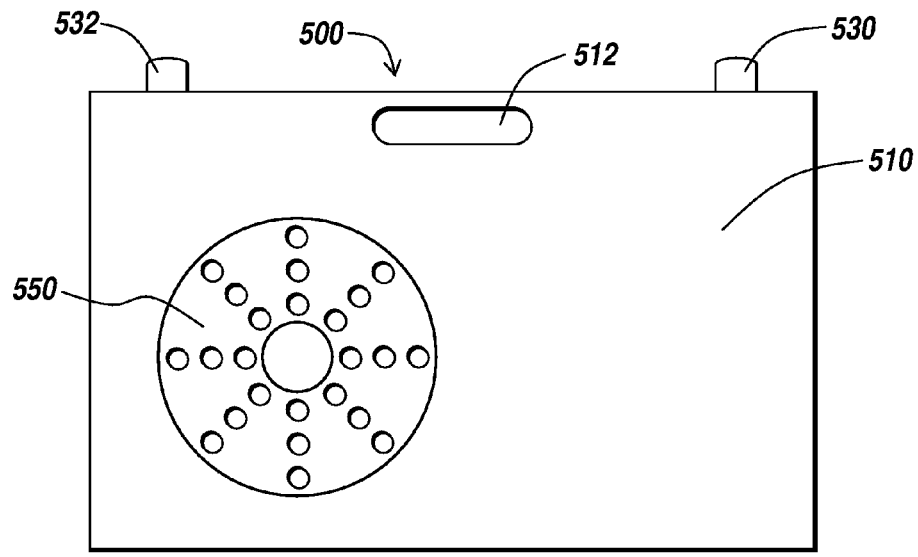
FIG. 5B depicts a back view of the badge of FIG. 5A.

FIGS. 5A and 5B depict one example embodiment of a wearable device, wherein the wearable device is a badge 500. The badge may be in the form of the standard institution-specific identification badge. FIG. 5A depicts a front view of the badge 500. FIG. 5B depicts a back view of the badge 500.

The badge 500 includes a housing 510 containing the protected zone recognition component 140. The housing 510 includes a thru-hole 512 for attaching a clip or lanyard to the badge 500. The housing 510 may be made of plastic or other suitable materials. On the front of the badge 500, the identification information for the wearer of the badge may be provided. This may include a photograph 520 of the person associated with the badge, as well as the name 522 and position 524 of the associated person. In embodiments wherein infrared (IR) transmission is used, the badge 500 may further include an external IR receiver 530 and/or an external IR transmitter 532. Preferably, a battery, such as a rechargeable or replaceable battery, powers the badge 500. In some embodiments, the badge 500 may include a port, such as a USB or Ethernet port that may be used for data transfer and charging the battery.

In certain embodiments, the wearable device 120 is capable of providing notice of the protected zone upon entering the protected zone. The notice may be audible, visual, tactile, or any combination thereof. In the example of FIGS. 5A and 5B, a visual notice is provided by a light-up indicator 540 such as a light emitting diode (LED) on the front side of the badge 500 as shown in FIG. 5A. An audible notice or alarm is provided by a speaker 550 provided on the back side of the badge 500 as shown in FIG. 5B. A tactile notice may be provided by vibration.

In some embodiments, the wearable device 120 may additionally provide notice that the wearer of the badge does not comply with the interaction criteria for a protected zone. When the wearable device enters into a non-compliance mode, the notice of non-compliance may be audible, visual, or tactile. In the example of FIGS. 5A and 5B, a visual notice is provided by a light-up indicator 560 such as a light emitting diode (LED) on the front side of the badge 500 as shown in FIG. 5A. An audible notice is provided by the speaker 550 provided on the back side of the badge 500 as shown in FIG. 5B. A tactile notice may be provided by vibration.

In some further embodiments, an override is provided on the wearable device 120. The override allows the user to turn off the notice of non-compliance provided by the wearable device 120. The override may be a button or a switch 570 provided on the badge 500 allowing the user to select the override. In other embodiments, the override may be provided by software executed on the wearable device 120. The availability of the override may also depend on the identity or role of the wearer of the wearable device. That is, certain wearers of a wearable device might not have the option of an override available to them. For example, in a hospital environment, doctors may have the option of an override while janitors may not. In some such embodiments, the use of an override may be recorded on the wearable device 120 or elsewhere on the system.

Figure 6A:
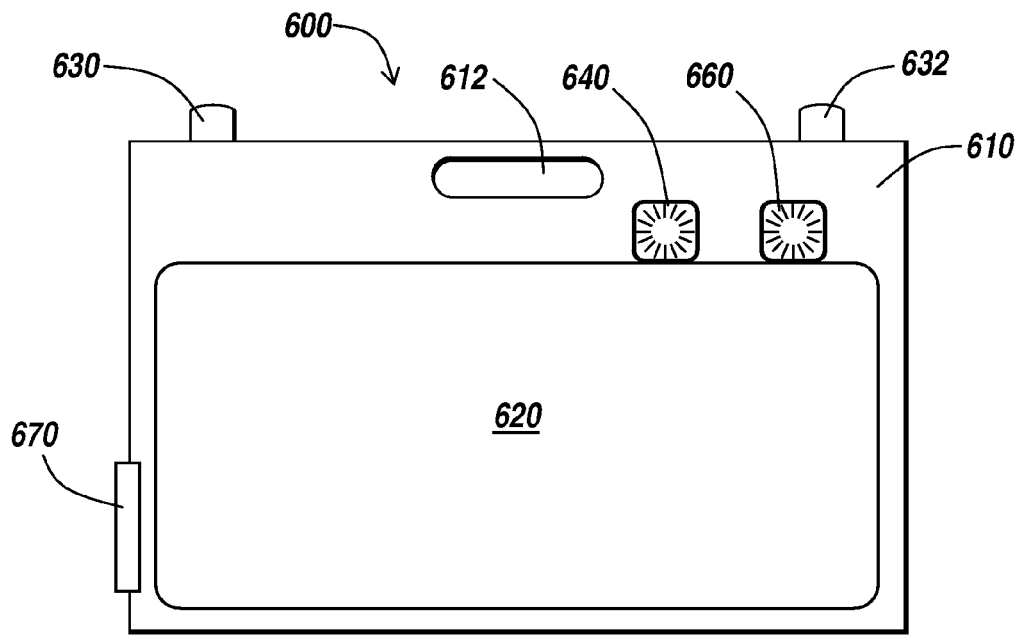
FIG. 6A depicts a front perspective view of an example wearable device wherein the wearable device is a badge holder.
Figure 6B:
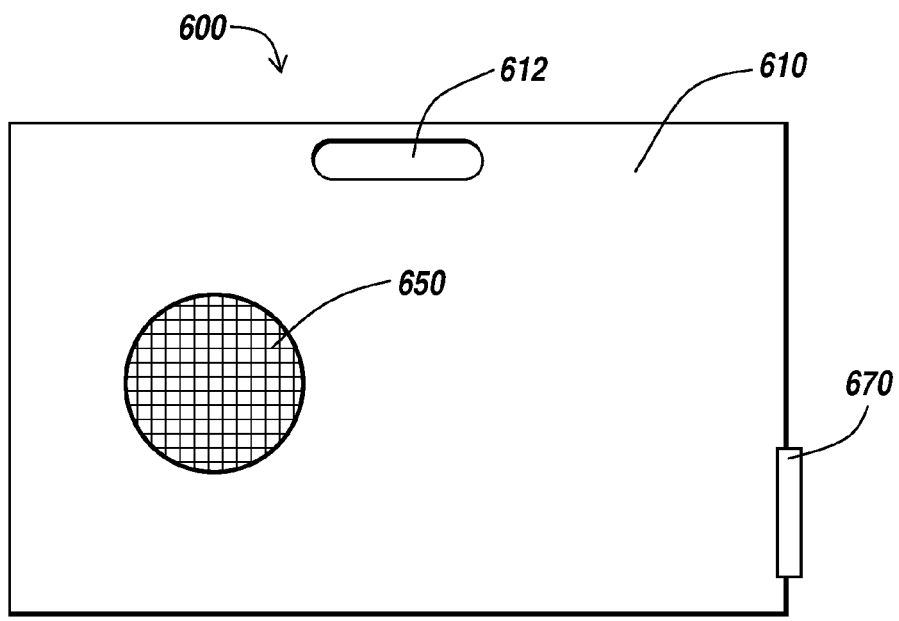
FIG. 6B depicts a back view of the badge holder of FIG. 6A.

FIGS. 6A and 6B depict another embodiment of a wearable device wherein the wearable device is a badge holder 600 wherein the wearable device is configured to attach to a standard institution-specific identification badge. FIG. 6A depicts a front view of the badge holder 600. FIG. 6B depicts a back view of the badge holder 600.

Similar to the badge 500 of FIGS. 5A and 5B, the badge holder 600 includes a housing 610 containing the protected zone recognition component 140. The housing 610 includes a thru-hole 612 for attaching a clip or lanyard to the badge holder 600. The housing 610 may be made of plastic or other suitable materials. The badge holder 600 pairs with a traditional identification badge. The badge holder 600 has an area 620 designed to receive and hold an identification badge. In embodiments wherein infrared (IR) transmission is used, an external IR receiver 630 and/or an external IR transmitter 632 may be provided on the badge holder 600. Preferably, the badge holder 600 may be powered by a battery, such as a rechargeable or replaceable battery. In some embodiments, the badge 500 may include a port, such as a USB or Ethernet port that may be used for data transfer and charging the battery.

As with the badge 500 of FIGS. 5A and 5B, the badge holder 600 may provide notice that the badge holder 600 has entered into a protected zone 130. The notice may be audible, visual, tactile, or any combination thereof. In the example of FIGS. 6A and 6B, a visual notice is provided by a light-up indicator 640 such as a light emitting diode (LED) on the front side of the badge holder 600 as shown in FIG. 6A. An audible notice is provided by a speaker 650 provided on the back side of the badge holder 600 as shown in FIG. 6B. A tactile notice may be provided by vibration.

The badge holder 600 may also provide notice that the wearer of the badge does not comply with the interaction criteria for a protected zone. The notice of non-compliance may be audible, visual, tactile, or any combination thereof. In the example of FIGS. 6A and 6B, a visual notice is provided by a light-up indicator 660 such as a light emitting diode (LED) on the front side of the badge holder 600 as shown in FIG. 6A. An audible notice is provided by the speaker 650 provided on the back side of the badge holder 600 as shown in FIG. 6B. A tactile notice may be provided by vibration.

The badge holder 600 may also be provided with an override functionality. The override may be a button or a switch 670 provided on the badge holder 600 allowing the user to select the override. The availability of the override may depend on the identity or role of the wearer of the wearable device. In some such embodiments, the use of an override may be recorded on the badge holder 600.

Interaction Criteria

As discussed previously, upon recognizing a protected zone 130, the protected zone recognition component 140 of the wearable device 120 identifies the interaction criteria for the protected zone 130. The interaction criteria may be the rules or requirements for interacting with the protected zone. For example, a protected zone 130 may be provided for an area containing hazardous material. Thus, the interaction criteria for the protected zone 130 could be that the wearer is trained or otherwise certified to handle hazardous materials. In another example, a protected zone 130 could be provided for a classified area. Thus, the interaction criteria for the protected zone 130 could be security clearance above a certain level.

In accordance with some embodiments of the present invention, the interaction criteria for a protected zone 130 may include temporal requirements. For example, in the example of the hazardous material area, there may be time limits for safe exposure to the hazardous material. In other embodiments, there may be a time limit for compliance with the interaction criteria. For example, a wearer of the wearable device entering the protected zone 130 must complete a requirement within X amount of time after entering the protected zone 130. In still other embodiments, the interaction criteria themselves may be derived based on the time of day. For example, in the evenings there may be lockdown of the facility for security purposes. In other words, a protected zone 130 may have one set of interaction criteria during the day and another set of interaction criteria during the evening, or some other combination of different criteria throughout a 24 hour period, or based on day, month, or even year.

In other embodiments, the interaction criteria may be biohazard requirements and/or notification. For example, a protected zone 130 may be provided for an area where virus research is conducted. The interaction criteria may include a general warning that the area contains biohazards as well as requirements that persons entering the protected zone 130 undertake safety precautions such as using a hazardous material suit.

In still another example embodiment of the present invention, the interaction criteria may be certification requirements. For example, a protected zone 130 may be provided for a highly contagious patient at a hospital. Thus, the interaction criteria for the protected zone 130 may be certification in infectious medicine.

In certain embodiments, the identity or role of the user wearing the wearable device may factor into the interaction criteria for a protected zone 130. For example, in a hospital setting, the interaction criteria derived by the protected zone recognition component 140 may be different for a doctor than for a janitor. Likewise, individual doctors may have different interaction criteria for the same protected zone 130.

In accordance with some embodiments of the present invention, the interaction criteria may also include requirements upon exiting the protected zone 130. For example, if the protected zone 130 is provided for a biohazard zone, the interaction criteria may include a requirement that the wearer of the wearable device visit a decontamination area after leaving the protected zone 130.

The interaction criteria may be configurable in allowing for any number of implementations, configurations, requirements, and/or permutations to serve a number of applications. In some such embodiments, the ability configure the interaction criteria may be restricted wherein access to configure the interaction criteria may require authorization, authentication, or both. For example, it may be desirable for only administrators to be able to configure interaction criteria. In other embodiment, different users may have different privileges for configuring interaction criteria.

Hospital Example Featuring Hand Washing Requirements

For greater understanding of the concepts set forth herein, the following example of a system deployed in a specific facility for a specific purpose is provided. The example deployment is in a hospital and is purposed with enforcing hand washing requirements. One possible embodiment of such a deployment can be seen in FIG. 7. However, it should be noted that the present invention is in no way limited to the specific examples described herein. These examples are merely provided for illustrative purposes.

Figure 7:
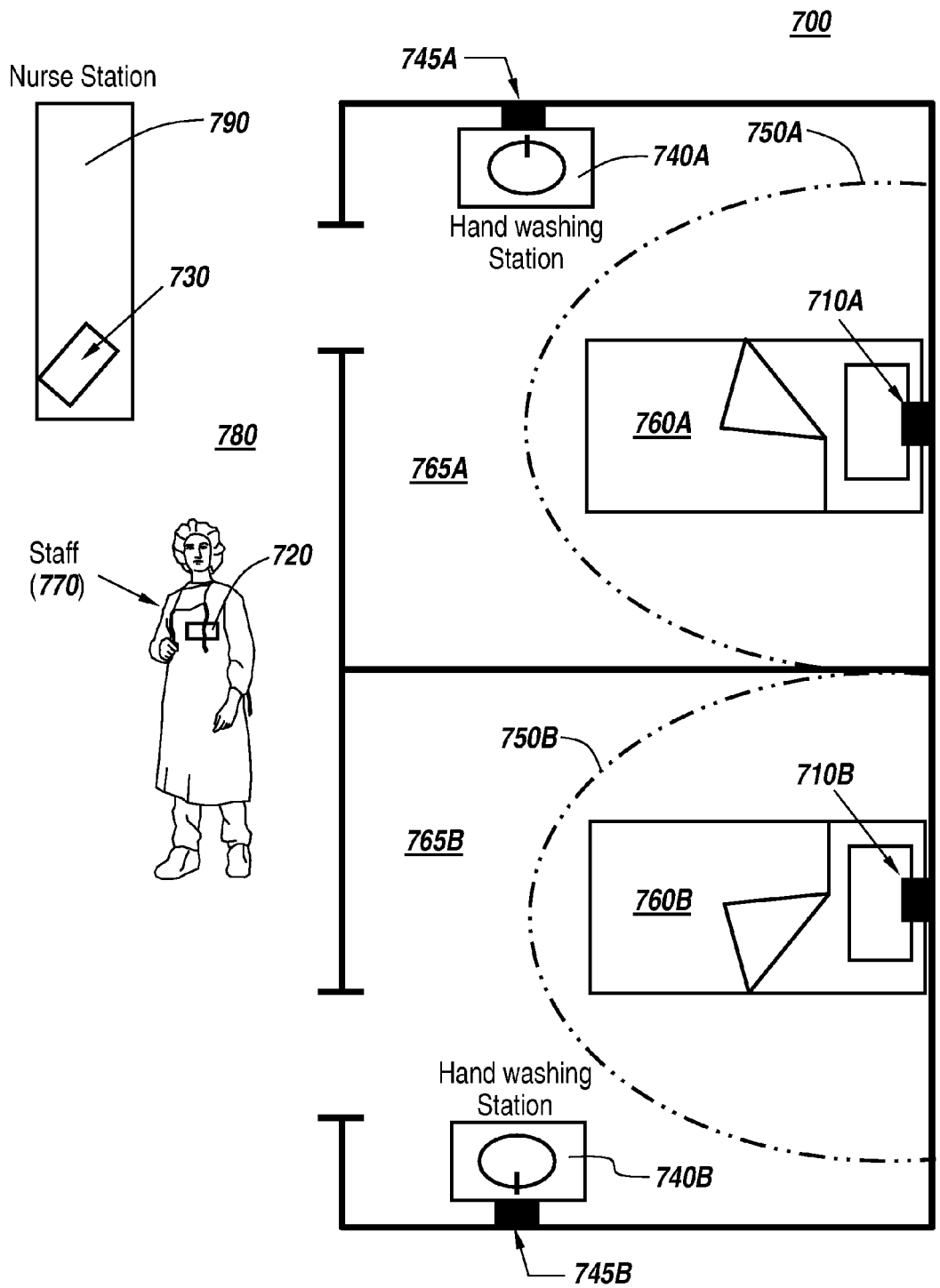
FIG. 7 depicts one example embodiment of a system for enforcing hand washing requirements in a hospital.

In FIG. 7, the system 700 has been deployed in a hospital environment. In this embodiment, the system 700 includes multiple protected zone designators 710A and 710B and a wearable device 720. In this embodiment, the system 700 further includes a base station 730, and multiple hand washing stations 740A and 740B.

The hand washing stations 740A and 740B may be sinks supplying water and soap, hand sanitizer dispensers, or the like, used to clean, sanitize, and/or disinfect an individual's hands. The hand washing stations 740A and 740B include transmitters 745A and 745B respectively. Transmitters 745A and 745B are configured to transmit data, such as a signal indicating that the respective hand washing station 740A or 750B has been used. The transmitters 745A and 745B may be infrared (IR), radio frequency (RF) or ultrasonic (US) transmitters. In accordance with some embodiments of the present invention, there may be multiple transmitters that may be of different types, so long as transmitters 745A or 745B transmit in a signal type that can be received by the wearable device 720. In accordance with some embodiments of the present invention, the hand washing stations 740A and 740B may further be equipped with receivers (not shown) allowing for a transponder configuration in which a signal is sent from the hand washing stations 740A and 740B in response to a query signal sent from the wearable device 720. As with the transmitters, the receivers may be infrared (IR), radio frequency (RF) or ultrasonic (US) based. In some such embodiments, the transmitters 745A or 745B may also be used in conjunction with the receivers in a transponder configuration such as discussed above with regard to the protected zone designator 110.

In the present example, the protected zone designators 710A and 710B are placed to provide protective zones 750A and 750B around patient beds 760A and 760B in rooms 765A and 765B respectively. Rooms 765A and 765B also contain hand washing stations 740A and 740B respectively.

A hospital staff member 770 such as a doctor or a nurse wears the wearable device 720. In the embodiment of FIG. 7, the staff member is in the corridor 780 outside of the rooms 765A and 765B. The corridor also contains a nurse's station 790 where the base station 730 is located.

To enforce hand washing requirements, the system is configured such that, when a hospital staff member 770 (wearing the wearable device 720) enters a protected zone 750A or 750B, a determination is made by the wearable device 720 whether the hospital staff member 770 has washed his or her hands just prior to entering the protected zone 750A or 750B. If the hospital staff member 770 has washed their hands, the wearable device 720 will record the compliance with the hand washing requirement. If the hospital staff member 770 has not washed their hands, the wearable device 720 will issue a warning or prompt that compliance with the hand washing requirements is required. As mentioned above with regard to the badge 500 and badge holder 600 embodiments, the warning or prompt may be audible, visual, tactile, or any combination thereof. After the warning has been issued, the hospital staff member 770 may activate an override, wash their hands in response to the warning, or not wash their hands in response to the warning. If the override is activated, the wearable device 720 records that the override was activated. If the hospital staff member 770 washes their hands in response to the warning, the wearable device 720 records that the wearer's hands were washed after the warning was issued. If, after a pre-selected amount of time (e.g. 30 seconds) the hospital staff member 770 does not wash their hands in response to the warning, then the wearable device 720 records their non-compliance with the hand washing requirement.

In order for the wearable device 720 to be able to determine if the hospital staff member 770 has washed their hands, the wearable device 720 is provided with a hand washing monitor 725 configured to record interactions with hand washing stations 740A and 740B. An example of this can be seen in FIG. 8.

FIG. 8 depicts one embodiment of a system 800 having a wearable device 720 and hand washing station 740 configured to interact with each other. The wearable device 720 includes the hand washing monitor 725 configured to keep track of interactions with the hand washing station 740. The hand washing station 740 may also include a monitor 742 that keeps track of the use of the hand washing station 740.

The monitor 742 of the hand washing station 740 may be configured to track the use of the hand washing station. For example, if the hand washing station is a sink, the monitor 742 may track the use of the faucet and the soap dispenser. If the hand washing station 740 is a hand sanitizer dispenser, then the monitor 742 may track the use of the dispenser. If the monitor 742 detects that the hand washing station 740 has been used, then the monitor 742 may direct the hand washing station to transmit a signal, such as a "wash stamp" indicating that the hand washing station was used. In certain embodiments, the signal transmitted may be unique. For example, a "wash stamp" transmitted by the hand washing station 740 may include an identification number for the hand washing station 740. The "wash stamp" may also include other information, such as time and date.

In accordance with some embodiments of the present invention, wherein the hand washing station 740 has a transponder configuration, the monitor 742 may wait for a signal received from the wearable device 720 before a signal indicating use is sent in response. In some embodiments, the monitor 742 may record each use of the hand washing station. In embodiments having a transponder configuration, the recorded data may include the identification information for the wearable device 720 interacting with the hand washing station 740. The recorded data may then be accessed and reviewed.

The hand washing monitor 725 of the wearable device 720 may be part of a protected zone recognition component 140 as set forth above, or it may be separate from the protected zone recognition component 140. The hand washing monitor 725 may be configured to receive the signals received from the hand washing station 740. For example, the hand washing monitor 725 may log or otherwise record "wash stamps" generated by the monitor 742 of the hand washing station 740 and data pertaining to the received "wash stamp." Data pertaining to the "wash stamp" may include the identification number of the hand washing station 740 from which the "wash stamp" was received as well as the time and date the "wash stamp" was received. This data may then be used to determine compliance with hand washing requirements. For example, to determine if the hospital staff member 770 has washed their hands, the data recorded by the hand washing monitor 725 may be consulted to indicate, among other things, whether a "wash stamp" has been received, when it was received, and from what hand washing station 740 it was received.

As mentioned previously, the interaction criteria may include a temporal aspect. In the example of hand washing example of FIGS. 7 and 8, the temporal aspect may include how long ago a signal or "wash stamp" indicating a hand washing was received prior to entering the protected zone 750A or 750B. For example, if the last received "wash stamp" was received more than 15 seconds prior to entering the protected zones 750A and 750B, chances are that the hands of the hospital staff member 770 are no longer sanitary. In that case the wearable device 720 may be configured to require a more recent "wash stamp" to comply with the hand washing requirement of the protected zones 750A and 750B. Likewise, the wearable device 720 may record how long it took to receive a "wash stamp" after the wearable device 720 issued a warning or prompt indicating the need for the hospital staff member 770 to wash their hands.

In accordance with certain aspects of the illustrative handwashing embodiments, the interaction criteria implementing the hand washing requirements also require the hospital staff member 770 to wash their hands after exiting the protected zones 750A or 750B. For example, the wearable device 720 may require that a new "wash stamp" be received within a pre-selected amount of time (e.g. 30 seconds) after exiting the protected zone to prevent the possible spread of infection. If a new "wash stamp" is not received within the allotted period a warning or prompt may be issued. The warning or prompt may be audible, visual, tactile, or any combination thereof. After the warning has been issued, the hospital staff member 770 may activate an override, wash their hands in response to the warning to receive a new "wash stamp," or not wash their hands in response to the warning. If the override is activated, the wearable device 720 records that the override was activated. If the hospital staff member 770 washes their hands in response to the warning, the wearable device 720 records that the "wash stamp" was received after the warning was issued. If, after a pre-selected amount of time, the hospital staff member 770 does not wash their hands in response to the warning, then the wearable device 720 records their non-compliance with the hand washing requirement.

In the example of FIG. 7 and FIG. 8, while it is indicated that the signal transmission may be of any type, in certain hospital environments, ultrasonic (US) may be a preferred transmission type over infrared (IR) and (RF). One operational constraint related to infrared transmission is that the transmissions are line of sight. That means if anything blocks the path between the transmitter and the receiver, the transmission will not reach the receiver. In a busy location such as a hospital, the chance of the line of sight of being blocked by equipment or even clothing is very likely. Radio frequency transmissions do not require line of site. Radio frequency transmission can even be received through walls. However, this provides its own operational constraint, because it is difficult to determine where a signal was transmitted from. For example, transmissions from the protected zone designators 710A could be received through the walls of the patient rooms 765A by the wearable device 720 when the hospital staff member 770 is in the corridor 780 or a different patient room 765B. This can lead to false non-compliance warnings and recordals by the wearable device 720. Ultrasonic transmission passes through clothing but will not pass through walls. That means transmissions from protected zone designators 710A will only be received while in the patient room 765A but will not be blocked if a piece of clothing covers the protected zone designators 710A or wearable device 720.

Base Station

Another element of the system set forth in FIG. 7 is the base station 730. In FIG. 7, the base station is located at the nurse's station 790 in the corridor 780. The base station 730 is configured to communicate with wearable device 720 for transferring data between the wearable device 720 and the base station 730. In this manner, compliance data can be downloaded from the wearable device 720 and interaction criteria can be uploaded to configure the wearable device 720. The base station 730 may also be configured to communicate with one or more of the protected zone designators 710A and 710B and hand washing stations 740A and 740B.

FIG. 9 depicts one example embodiment of a base station 730 that may be used in the system of FIG. 7. In this embodiment, the base station 730 includes a workstation 900 and a wearable device rack 910. The workstation 900 may include a terminal 902, a computer, such as a personal computer 904, and input devices such as a keyboard 906 and a mouse 908. In other embodiments, the workstation may be a terminal 902 connected to a remote or centrally located computer, such as a server. In other embodiments, the workstation 900 may part of another system such as Electrical Medical Record (EMR) system.

The wearable device rack 910 is connected the workstation 900. For example, the wearable device rack 910 may be connected via a USB connection. The wearable device rack 910 provides a convenient place to deposit one or more wearable devices 720 allowing data to be transferred to and from the wearable device 720 to the workstation 900. The wearable device rack 910 may include a number of slots or cradles for receiving the wearable devices 720. As mentioned previously, wearable devices such as the badge 500 or badge holder 600 may be provided with ports, such as USB ports, for transferring data and charging the batteries of the wearable device 720. Each slot or cradle of the wearable device rack 910 may be provided with a USB plug to mate with the respective USB port of the wearable device 720. Placing the wearable device 720 into a slot or cradle connects the wearable device 720 to the workstation 900 for charging and data transfer. For example, at the end of their shift, a hospital staff member 770 may place there wearable device 720 in the cradle allowing the wearable device to recharge, while the compliance data recorded for the shift is downloaded to the workstation 900 for storage and analysis. Alternatively, the data transfer communication may take place using a wireless communication technology.

In accordance with some embodiments of the present invention, the base station 730 does not include a wearable device rack 910. Instead, the wearable device 720 may communicate with the workstation 900 of the base station 730 directly using either a wired or wireless connection. In some such embodiments, the workstation 900 may be located remotely or at a central location (such as a computer of data center) wherein the wearable device 720 communicates wirelessly (using its internal transmitter and receiver or additional wireless technology) or via an Ethernet connection to the workstation 900.

In accordance with some embodiments of the present invention, the base station 730 may also be used to configure the wearable device 720. For example, the interaction criteria that determine the hand washing requirements for the protected zones 750A and 750B may be configured for the wearable device 720 using the base station 730. An example of this can be seen in FIG. 10.

FIG. 10 depicts an example graphical user interface (GUI) 1000 used to register the wearable device, in this case a badge 500, to associate the badge 500 with a particular hospital staff member 770. In this embodiment, the GUI provides a number of fields to be filled in by a user. The first field is the badge number field 1010. In the badge number field 1010, the user enters the identification number of the wearable device 720 being configured. The next field is the badge wearer field 1020. In the badge wearer field 1020, the user enters the name of the hospital staff member 770 with whom the wearable device 720 is to be associated. The next field is the role field 1030. In role field 1030, the user identifies the role of the hospital staff member 770 associated with the wearable device 720. For example, the role of the hospital staff member 770 may be "doctor," "nurse," or the like. The final displayed field is the certification field 1040. In certification field 1040, the user enters the certification level of the hospital staff member 770 associated with the wearable device 720. For example, the hospital staff member 770 may be certified in infectious medicine. Based on the information provided by the user, the wearable device may then be configured for the particular hospital staff member 770. For example, if the hospital staff member is a doctor certified in infectious medicine, the wearable device may be configured to allow the doctor to activate the override on the wearable device when in a protected zone Likewise, the time limit for washing the doctor's hands after entering or leaving the protected zone may also be adjusted.

It should be understood that the fields 1010, 1020, 1030, 1040 depicted in FIG. 10 are but a few of a number of possible fields. In accordance with some example embodiments of the present invention, other fields may be provided depending on the information entered in previous fields. In other embodiments, the field may be provided to specify individually each interaction criteria. In certain embodiments, the fields provided may depend on the identity of the user of the base station. That is, the ability to configure a wearable device may require authorization and/or authentication. For example, a department head may be provided with more ability to configure a badge than an individual doctor or nurse in the department.

As previously discussed, in some embodiments, the base station 730 may be configured to communicate wirelessly with one or more of the wearable device 720, protected zone designators 710A and 710B, and hand washing stations 740A and 740B. One advantage of such wireless communication is it allows for constant and continuous updates to the system. Thus, the protected zones and interaction criteria can be updated or modified as needed. Likewise the status of wearable device 720, protected zone designators 710A and 710B and hand washing stations 740A and 740B may also continuously monitored.

As mentioned in the discussion of protected zone designator 110, the receiver 220 of the protected zone designator 110 may be used to receive signals for configuring the protected zone designator 110. As mentioned in the discussion of the wearable device 120, the receiver 400 of the wearable device 120 may be used to receive signals for configuring the wearable device 120. Likewise, the one or more transmitters 440 of the wearable device 120 may be used to transfer recorded compliance data. Similarly, the transmitters 745A and 745B and as receiver (not shown) of the hand washing stations 740A and 740B may also be used to transfer data to and from the base station 730. In embodiments where the primary transmission medium implemented in the system is not ideally suited for such data transfer with the base station 730 (such as ultrasonic in the system of FIG. 7), the protected zone designators 710A and 710B, wearable device 720, and hand washing stations 740A and 740B may be provide with secondary transmitters and receivers using a more advantageous transmission medium for such data transfer (such as radio frequency).

Once data is obtained from the wearable device 720, protected zone designators 710A and 710B, and hand washing stations 740A and 740B, the data can be stored and analyzed. This data can be used to determine how well the protocols and requirements are being enforced. In the hand washing example, hospital administrators can use the data to determine if hand washing protocol goals are being met, determine who is or is not complying with the hand washing protocols, and further configure the system to improve compliance. In some embodiments, incentives or demerits may be provided based on an individual's compliance.

Method

Figure 11:
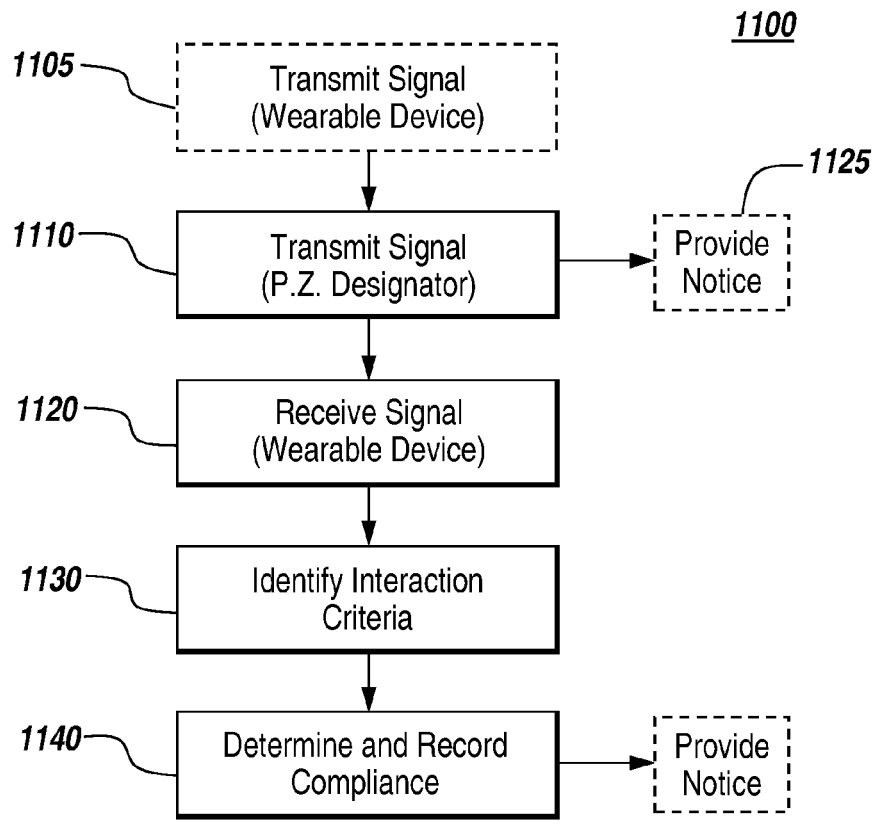
FIG. 11 is a flowchart of one example embodiment of a methodology practiced with the system of FIG. 1.

FIG. 11 depicts a flow chart 1100 of one example embodiment of a methodology used for establishing a protected zone and monitoring interactions therewith in accordance with one embodiment of the present invention. For example, the depicted method can be implemented with the system depicted in FIG. 1. The method begins with the protected zone designator 110 transmitting a signal (step 1110). The transmission of the signal defines the protected zone 130. In certain embodiments, the signal is transmitted from the protected zone designator 110 in response to a signal from the wearable device 120 (step 1105). The wearable device 120 receives the signal upon entry of the wearable device 120 into the protected zone 130 (step 1120). In certain embodiments, the wearable device 120 may provide notice that the protected zone 130 has been entered (step 1125). For example, a warning, such as an audible, visual, and/or tactile warning may be provided. The protected zone recognition component 140 of the wearable device 120 then identifies the interaction criteria for the protected zone (step 1130). The protected zone recognition component 140 of the wearable device 120 then determines and records compliance with the identified interaction criteria (step 1140). In certain embodiments, the wearable device 120 may also provide notice of non-compliance (step 1145). For example, a warning or alarm, such as an audible, visual, and/or tactile warning may be provided.

The determination of compliance with the interactive criteria depends on the requirements or protocols implemented by the interactive criteria. For example, in the embodiment of FIGS. 7 and 8, the interactive criteria were used to implement hand washing requirements. To determine if a hospital staff member 770 washed their hands, "wash stamps" were used. One embodiment of a methodology for implementing this system can be seen in FIG. 12.

Figure 12:
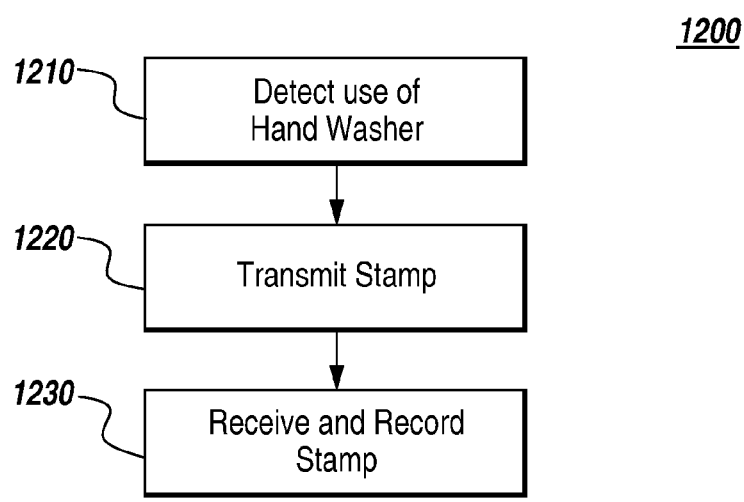
FIG. 12 is a flowchart of one example embodiment of a methodology practiced with the subsystem of FIG. 8.

FIG. 12 depicts a flow chart 1200 of one embodiment of a method of the interaction between the wearable device 720 and hand washing stations 740 depicted in FIG. 8. First, it is determined if hand washing station 740 has been used (step 1210). This may be done by the monitor 742 of the hand washing station. Then a signal, such a "wash stamp," indicating that hand washing station has been used is transmitted (step 1220). The "wash stamp" is then received and recorded at the wearable device 720 indicating the hospital staff member 770 has washed their hands (step 1230). In certain embodiments, this may be performed by hand washing monitor 725 of the wearable device 720.

Figure 13:
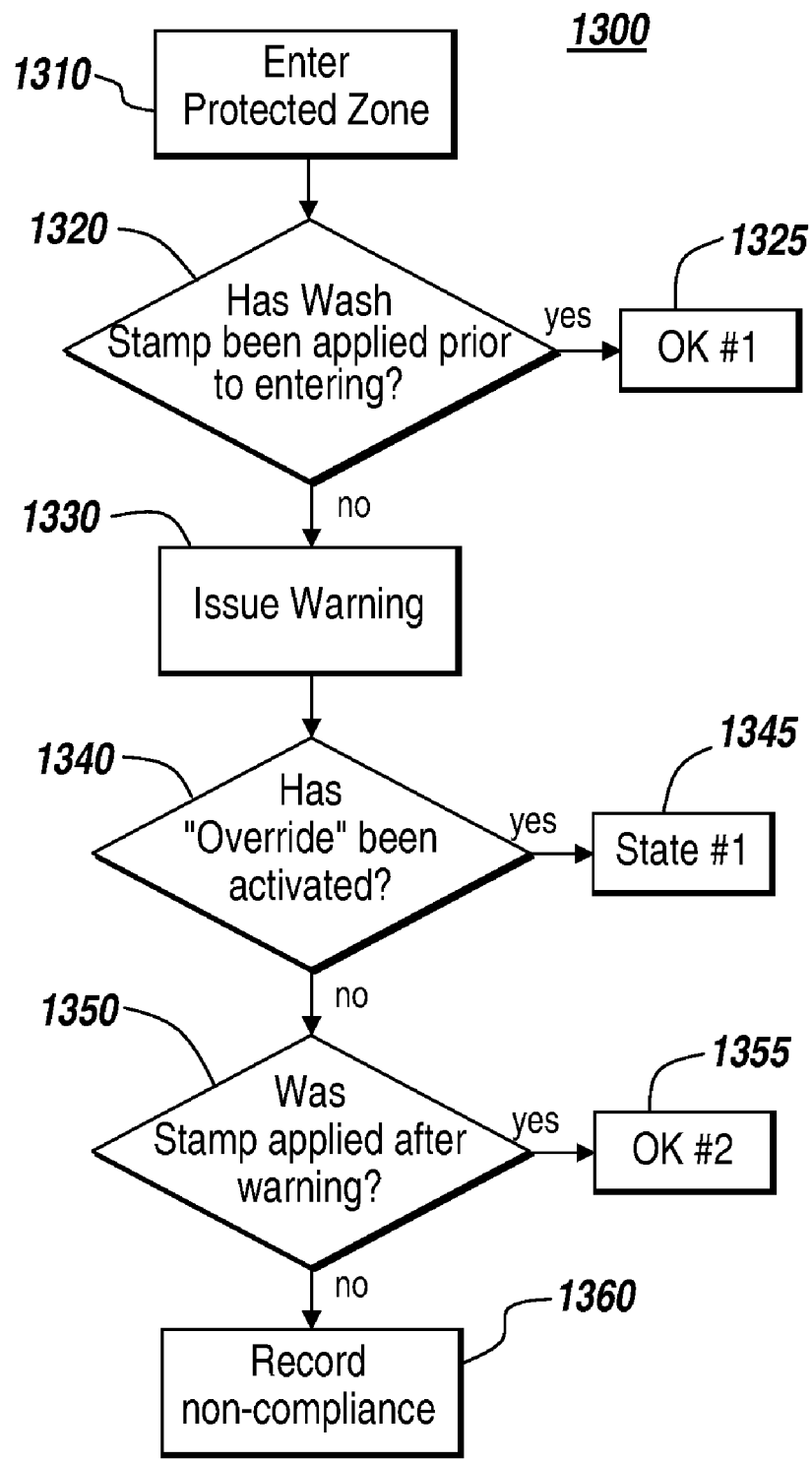
FIG. 13 is a flowchart of one example embodiment of a methodology practiced with the subsystem of FIG. 7.

FIG. 13 depicts a flow chart 1300 of a methodology practiced to enforce hand washing requirements in a hospital. It may be practiced using the system of FIG. 7. The hospital staff member 770 enters one of the protected zones 750A and 750B (step 1310). It is then determined if a "wash stamp" was received by the wearable device 720 prior to entering the protected zone 750A or 750B (step 1320). If a "wash stamp" was received, the wearable device 720 records a satisfactory entry ("OK #1") (step 1325). If a "wash stamp" was not received prior to entering the protected zone 750A or 750B, the wearable device issues a warning (step 1330). The wearable device then determines if the override has been activated (step 1340). If the override was activated, the wearable device 720 records the activation ("State 1") (step 1345). If the override was not activated, the wearable device 720 determines if a "wash stamp" was received after the warning (step 1350). If a "wash stamp" was received, then the wearable device 720 records a satisfactory entry ("OK #2") (step 1355). If a "wash stamp" was not received then the non-compliance is recorded (step 1360).

Figure 14:
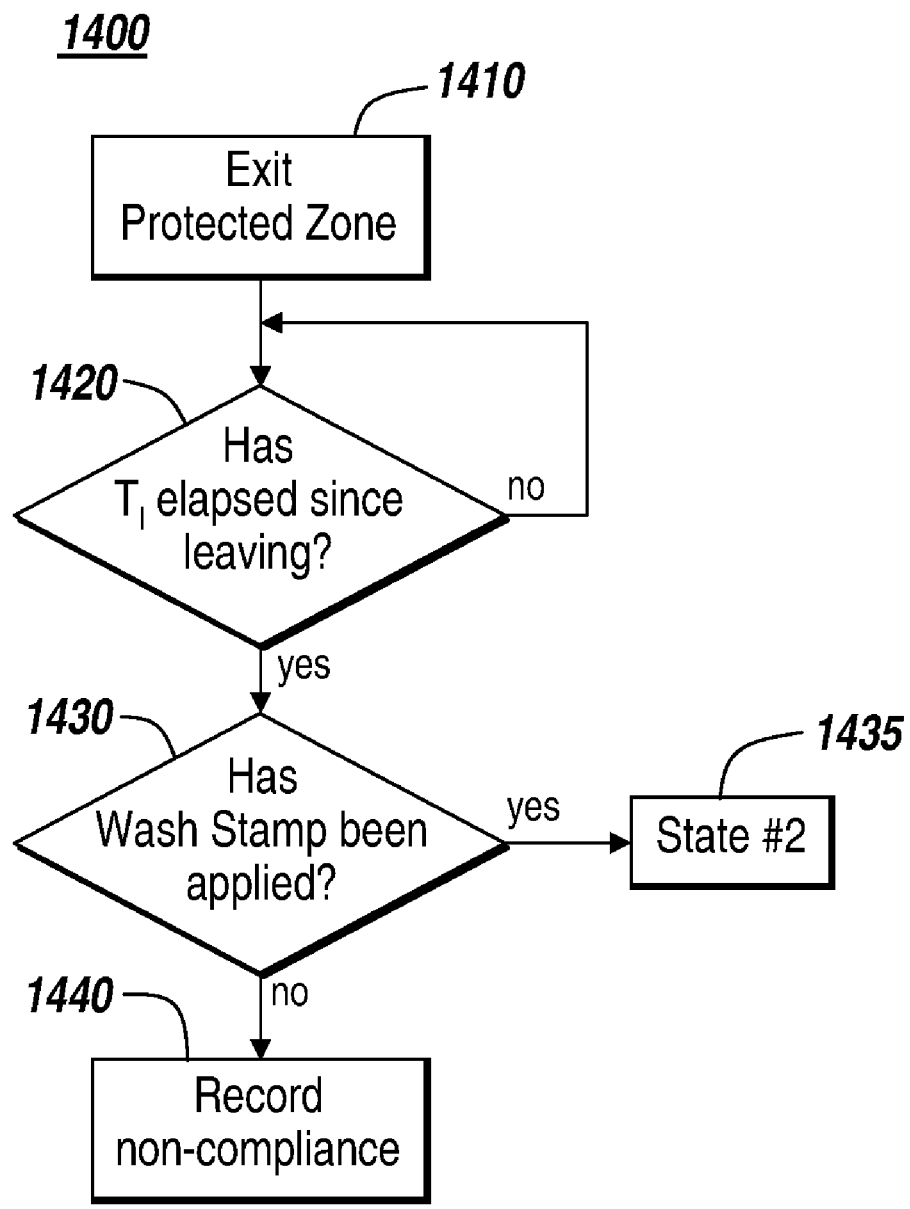
FIG. 14 is a flowchart of another example embodiment of a methodology practiced with the subsystem of FIG. 7.

FIG. 14 depicts a flow chart 1400 of a methodology practiced to enforce hand washing requirements in a hospital after leaving the protected zones 750A and 750B. The hospital staff member 770 exits one of the protected zones 750A and 750B (step 1410). It is then determined if time $T_1$ has elapsed since leaving the protected zones 750A and 750B (step 1420). For example, time $T_1$ may be 30 seconds. It is then determined if a "wash stamp" was received prior to time $T_1$ elapsing (step 1430). If a "wash stamp" was received, the wearable device 720 records a satisfactory entry ("State 2") (step 1435). If a "wash stamp" was not received prior to time $T_1$ elapsing, the wearable device 720 will record the non-compliance (step 1440).

Thus, the system and methodologies of the present invention provide an effective means to enforce protocols necessary to comply with health, safety, insurance, and regulatory requirements. A protected zone designator is placed at the location enforcement of the protocols is desired. The protected zone designators transmit a signal that determines a protected zone. Employees are provided with wearable devices that can receive the signal transmitted by the protected zone identifier. When a wearable device enters the protected zone, the wearable device recognizes the protected zone and identifies the interaction criteria for the protected zone. The interaction criteria are requirements necessary to comply with the desired protocols. The wearable device determines and records compliance with the interaction criteria. The recorded compliance data may then be analyzed to determine the level of compliance with the protocols being enforced.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention that, as a matter of language, might be said to fall therebetween.

The invention claimed is:

1. A system for establishing a protected zone and monitoring interactions therewith, the system comprising:
    a protected zone designator for establishing the protected zone, the protected zone designator configured for placement at a location in which the protected zone is desired, the protected zone designator having a transmitter transmitting one or more signals that establish the protected zone; and
    a wearable device separate and distal from the protected zone designator, the wearable device comprising a protected zone recognition component configured to recognize the protected zone and identify pre-defined interaction criteria for the protected zone and configured to be associated with a particular user wearing the wearable device, the protected zone recognition component comprising:
        a signal receiver capable of receiving the one or more signals that establish the protected zone;
        a processor connected to the signal receiver; and
        a recordable medium connected to the processor and storing instructions for the processor;
    wherein upon the wearable device entering the protected zone, the protected zone recognition component recognizes the protected zone and identifies the interaction criteria of the protected zone and based on the interaction criteria the wearable device determines and records compliance of the particular individual with the interaction criteria in the recordable medium.

2. The system of claim 1, wherein the protected zone designator transmitter transmits one or more signals having a transmission range establishing the protected zone.

3. The system of claim 2, wherein the transmitter comprises an ultrasonic transmitter.

4. The system of claim 1, wherein the wearable device comprises a badge.

5. The system of claim 1, wherein the wearable device comprises a badge holder.

6. The system of claim 1, wherein the signal receiver comprises an ultrasonic receiver.

7. The system of claim 1, wherein the protected zone designator comprises a transponder.

8. The system of claim 7, wherein the protected zone recognition component comprises a transmitter for transmitting a signal to the transponder; and a receiver for receiving a responsive signal from the transponder in response to the signal transmitted from the transmitter.

9. The system of claim 1, wherein upon the wearable device entering the protected zone, the wearable device provides notice of the protected zone.

10. The system of claim 1, wherein after the wearable device determines compliance with the interaction criteria, if there is non-compliance, the wearable device enters a non-compliance mode.

11. The system of claim 10, wherein the non-compliance mode comprises an alarm emission from the wearable device.

12. The system of claim 1, wherein the interaction criteria for the protected zone comprise hand washing requirements.

13. The system of claim 12, wherein the hand washing requirements comprise
a determination that a user of the wearable device has washed their hands prior to entering the protected zone.

14. The system of claim 13, wherein the wearable device further comprises:
a hand washing monitor configured to record interactions with a hand washing station.

15. The system of claim 12, wherein the hand washing requirements comprise:
a determination that a user of the wearable device has washed there their hands after exiting the protected zone.

16. The system of claim 1, wherein the interaction criteria for the protected zone comprise temporal requirements.

17. The system of claim 1, wherein the interaction criteria for the protected zone are derived from time of day.

18. The system of claim 1, wherein the interaction criteria for the protected zone include a time limit for compliance with the interaction criteria.

19. The system of claim 1, wherein the interaction criteria for the protected zone comprise certification requirements.

20. The system of claim 1, wherein the interaction criteria for the protected zone are derived from a role of a user of the wearable device.

21. The system of claim 1, wherein the interaction criteria for the protected zone are derived from an identity of a user of the wearable device.

22. The system of claim 1, wherein the interaction criteria for the protected zone comprises biohazard requirements and/or notification.

23. The system of claim 1, wherein the wearable device further comprises an override for an action resulting from determination of a non-compliance of the interaction criteria.

24. The system of claim 23, wherein the override is selectable by a user of the wearable device.

25. The system of claim 23, wherein availability of the override depends on an identity of a user the wearable device.

26. The system of claim 23, wherein availability of the override depends on a role of a user of the wearable device.

27. The system of claim 23, wherein use of the override is recoded by the wearable device.

28. The system of claim 1, wherein the interaction criteria comprises requirements upon the wearable device exiting the protected zone.

29. The system of claim 1, wherein the interaction criteria are configurable.

30. The system of claim 29, wherein access to configure the interaction criteria requires authorization, authentication, or both.

31. The system of claim 1, further comprising a base station configured to communicate with the wearable device for transferring data between the wearable device and the base station.

32. The system of claim 31, wherein the base station communicates with the wearable device wirelessly.

33. The system of claim 31, wherein the interaction criteria are configured using the base station.

34. The system of claim 31, wherein the base station provides a graphical user interface for configuring the interaction criteria.

35. A method of establishing a protected zone and monitoring interactions therewith, the method comprising:
a protected zone designator having a transmitter transmitting a signal that defines the protected zone;
receiving the signal at a wearable device upon entry of the wearable device into the protected zone, the wearable device being configured to be associated with a particular user wearing the wearable device and having a signal receiver capable of receiving the signal that defines the protected zone;
the wearable device identifying predetermined interaction criteria for the protected zone using a processor on the wearable device connected to the signal receiver; and
based on the interaction criteria, the wearable device determining and recording compliance of the particular user with the interaction criteria in a recordable medium on the wearable device connected to the processor.

36. The method of claim 35, wherein the protected zone designator transmits the signal in response to receiving a signal from the wearable device.

37. The method of claim 35, further comprising: the wearable device providing notice of the protected zone.

38. The method of claim 35, further comprising: the wearable device entering a non-compliance mode if there is a non-compliance of the interaction criteria.

39. The method of claim 38, wherein entering the non-compliance mode comprises emitting an alarm from the wearable device.

40. The method of claim 35, wherein the interaction criteria for the protected zone comprise hand washing requirements.

41. The method of claim 40, wherein the hand washing requirements comprise determining if a user of the wearable device has washed their hands prior to entering the protected zone.

42. The method of claim 41, further comprising:
receiving at the wearable device a signal from a hand washing station indicating that the user of the wearable device has washed their hands;
the wearable device recoding the signal received from the hand washing station.

43. The method of claim 40, wherein the hand washing requirements comprise:

determining that a user of the wearable device has washed their hands after exiting the protected zone.

44. The method of claim 35, wherein the interaction criteria for the protected zone comprise temporal requirements.

45. The method of claim 35, wherein the interaction criteria for the protected zone are derived from time of day.

46. The method of claim 35, wherein the interaction criteria for the protected zone include a time limit for compliance with the interaction criteria.

47. The method of claim 35, wherein the interaction criteria for the protected zone comprise certification requirements.

48. The method of claim 35, wherein the interaction criteria for the protected zone are derived from a role of the user of the wearable device.

49. The method of claim 35, wherein the interaction criteria for the protected zone are derived from an identity of the user of the wearable device.

50. The method of claim 35, wherein the interaction criteria for the protected zone comprise biohazard requirements and/or notification.

51. The method of claim 35, wherein the interaction criteria comprise requirements upon the wearable device exiting the protected zone.

52. The method claim 35, further comprising:
providing an override for the interaction criteria;
determining whether the override for the interaction criteria has been activated; and
if the override has been activated, recording activation of the override.

53. The method of claim 52, wherein providing the override is based on a role of a user of the wearable device.

54. The method of claim 52, wherein providing the override is based on an identity of a user of the wearable device.

55. The method of claim 35, wherein the interaction criteria is configurable.

56. The method of claim 35, further comprising:
a base station communicating with the wearable device to transfer data between the wearable device and the base station.

* * * * *

UNITED STATES PATENT AND TRADEMARK OFFICE
CERTIFICATE OF CORRECTION

| | |
|---|---|
| PATENT NO. | : 8,212,653 B1 |
| APPLICATION NO. | : 12/052543 |
| DATED | : July 3, 2012 |
| INVENTOR(S) | : Arthur L. Goldstein et al. |

It is certified that error appears in the above-identified patent and that said Letters Patent is hereby corrected as shown below:

In the Claims:

In column 17, in line 43 of claim 15, change:

"washed there their hands after exiting the protected"

to

"washed their hands after exiting the protected"

Signed and Sealed this
Twenty-eighth Day of August, 2012

David J. Kappos
*Director of the United States Patent and Trademark Office*